(12) United States Patent
Ma et al.

(10) Patent No.: US 12,511,170 B2
(45) Date of Patent: Dec. 30, 2025

(54) COMPUTATIONAL GRAPH OPTIMIZATION AND ACCESS MODE SELECTION FOR HETERGENEOUS HARDWARE

(71) Applicant: BEIJING BAIDU NETCOM SCIENCE TECHNOLOGY CO., LTD., Beijing (CN)

(72) Inventors: Yanjun Ma, Beijing (CN); Haifeng Wang, Beijing (CN); Xiaoguang Hu, Beijing (CN); Dianhai Yu, Beijing (CN); Tian Wu, Beijing (CN); Qi Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 513 days.

(21) Appl. No.: 18/063,137

(22) Filed: Dec. 8, 2022

(65) Prior Publication Data

US 2023/0107440 A1 Apr. 6, 2023

(30) Foreign Application Priority Data

Dec. 10, 2021 (CN) .......................... 202111506921.1

(51) Int. Cl.
*G06F 9/50* (2006.01)
(52) U.S. Cl.
CPC .................. *G06F 9/5066* (2013.01)
(58) Field of Classification Search
None
See application file for complete search history.

(56) References Cited

U.S. PATENT DOCUMENTS

2015/0074634 A1 3/2015 Lee
2016/0085430 A1* 3/2016 Moran .............. H04M 1/72454
715/765
(Continued)

FOREIGN PATENT DOCUMENTS

CN 112527281 A 3/2021
CN 112529206 A 3/2021
(Continued)

OTHER PUBLICATIONS

Office Action issued in Korean Application No. 10-2022-0154379, mailed on Sep. 20, 2024 (11 pages).
(Continued)

*Primary Examiner* — Eric C Wai
(74) *Attorney, Agent, or Firm* — Osha Bergman Watanabe & Burton LLP

(57) ABSTRACT

The disclosure provides an access method, an access apparatus, an electronic device and a computer storage medium, and relates to a field of computer technologies, in particular to a field of artificial intelligence technologies such as chip and deep learning. The method includes: determining a computational graph for calling an access device based on operator representations in a target model; optimizing the computational graph based on information of the access device; and performing relevant running operations of the target model on the access device based on the computational graph and an interface for the access device to access to a model framework of the target model, the interface being determined based on kit data of the access device.

17 Claims, 5 Drawing Sheets

(56) References Cited

U.S. PATENT DOCUMENTS

2019/0392296 A1   12/2019  Brady
2021/0248115 A1    8/2021  Jones et al.

FOREIGN PATENT DOCUMENTS

| CN | 112819153 A | 5/2021 |
| CN | 112905323 A | 6/2021 |
| EP | 3836030 A1 | 6/2021 |
| JP | 2021528740 A | 10/2021 |
| KR | 20210073242 A | 6/2021 |

OTHER PUBLICATIONS

Notification of Reasons for Refusal issued in Japanese Application No. 2022-195289, mailed on Nov. 14, 2023 (6 pages).
Notice of Allowance issued for corresponding Chinese patent application 202111506921.1, issued Jul. 14, 2022 (10 pages).
Ding Xiaosong "Network Layer and Operator Fusion of deep Learning Inference Acceleration Method in "Algorithic Theory";" Aug. 2020 (12 pages).
Extended European Search Report issued in European Application No. 22211848.1, mailed on Jun. 16, 2023 (10 pages).
Nadav Rotem et al.; "Glow: Graph Lowering Compiler Techniques for Neural Networks;" Apr. 3, 2019; pp. 1-12 (12 pages).
Notice of Allowance issued in Korean Application No. 10-2022-0154379, mailed on May 2, 2025 (10 Pages).

\* cited by examiner

COMPUTATIONAL GRAPH OPTIMIZATION AND ACCESS MODE SELECTION FOR HETERGENEOUS HARDWARE

CROSS REFERENCE TO RELATED APPLICATIONS

This application is based on and claims priority to Chinese patent applications Serial No. 202111506921.1 filed on Dec. 10, 2021, the entire contents of which are incorporated herein by reference.

TECHNICAL FIELD

The disclosure relates to a field of computer technologies, in particular to a field of Artificial Intelligence (AI) technologies such as chip and deep learning.

BACKGROUND

With the development of computer technologies, AI technologies such as deep learning and the like are also developing rapidly. Models in the AI field, such as deep learning models or machine learning models, are at the core of AI technologies.

The operation of models generally requires the support of hardware, but the variability of hardware devices leads to some adaptation problems when running the models.

SUMMARY

The disclosure provides an access method, an access apparatus, an electronic device and a computer storage medium.

According to a first aspect of the disclosure, an access method is provided. The method includes:
  determining a computational graph for calling an access device based on operator representations in a target model;
  optimizing the computational graph based on information of the access device; and
  performing relevant running operations of the target model on the access device based on the computational graph and an interface for the access device to access a model framework of the target model, the interface being determined based on kit data of the access device.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the at least one processor is caused to implement the method of any one of the embodiments of the disclosure.

According to a third aspect of the disclosure, a non-transitory computer-readable storage medium storing computer instructions is provided. The computer instructions are configured to cause a computer to implement the method of any one of the embodiments of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
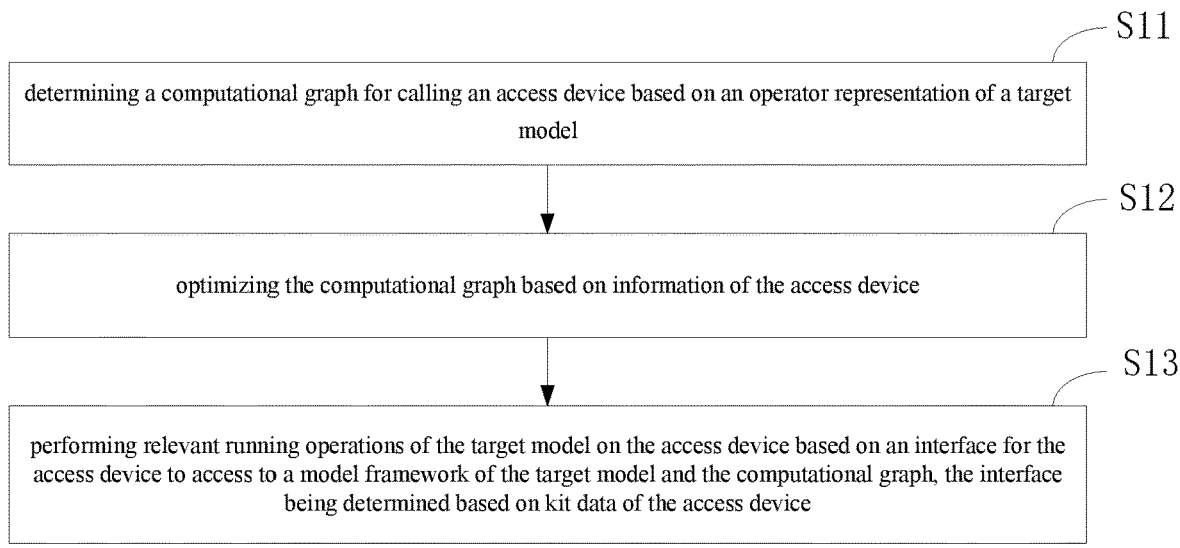
FIG. 1 is a flowchart of an access method according to an embodiment of the disclosure.

According to the embodiments of the disclosure, an access method is provided. FIG. 1 is a flowchart of an access method according to the embodiment of the disclosure. The method can be applied to an access apparatus for operating a model. For example, the apparatus may be deployed in a terminal, a server or other processing devices, to execute steps such as determining a computational graph of the access device, and optimizing the computational graph. The terminal may be a user equipment (UE), a mobile device, a cellular phone, a cordless phone, a personal digital assistant (PDA), a handheld device, a computing device, an in-vehicle device and a wearable device. In some possible implementations, the method may also be implemented by means of calling computer readable instructions stored in a memory by a processor. As illustrated in FIG. 1, the access method includes the following blocks.

At block S11, a computational graph for calling an access device is determined based on an operator representation of a target model.

At block S12, the computational graph is optimized based on information of the access device.

At block S13, relevant running operations of the target model are performed on the access device based on an interface for the access device to access a model framework of the target model and the computational graph, the interface being determined based on kit data of the access device.

The target model in the embodiment may be a deep learning model, a machine learning model or any other model which may run on the access apparatus and used to perform operations such as data processing or data transmission.

The access apparatus in the embodiment may be a terminal, a server, or any other device capable of running using chips. The access apparatus may also be a chip, such as Compute Unified Device Architecture (CUDA).

For example, the target model may be a model for image processing, a model for text processing, a model for video data or speech data processing, a model for weather prediction, a model for traffic data prediction, a model for natural environment data prediction, or a model for human behavior data prediction.

The target model may include a model framework and a model portion. The model framework can be a deep learning framework. In the initial stage of deep learning, each deep learning researcher needs to write a lot of repetitive codes. In order to improve work efficiency, some researchers have written these codes into a framework and made it public, so that the framework can be used by all the researchers. Then, various frameworks have appeared. Over time, the most useful frameworks have been used by a large number of people and become popular, and these mainstream frameworks can be called deep learning frameworks.

Deep learning framework is at a key position of the AI technology system, it manages the AI chips and a large scale of computer system resources and undertakes various business models and industry applications. At the same time, the global intelligent chip industry is booming and intelligent chip products are currently in an explosive growth phase. The core problem to be solved by the deep learning framework is to adapt to more hardware so as to avoid the high development costs caused by inconsistence of underlying software and hardware facilities.

The main difficulty in adapting the deep learning framework to a variety of heterogeneous hardware lies in the fact that different intelligent chips have different designs in terms of instruction set IP (IP core) and chip architecture, resulting in differences in the Software Development Kit (SDK) provided by different hardware platforms. Generally, the SDK of an AI chip can be divided into: the most basic device driver and runtime modules; modules for deep learning tasks, such as Deep Neural Networks (DNN) operator library, Basic Linear Algebra Subroutine (BLAS) mathematical library and communication library; and graph compilation modules that support construction, optimization and execution of deep learning models (partially supported by the hardware, generally through a neural network compiler or the hardware platform's graph compilation engine). In order for the deep learning framework to have a capability of accessing multiple heterogeneous hardware with a low cost, the framework needs to have a more universal hardware access design to avoid the high development cost caused by inconsistent underlying hardware SDKs. In order for the deep learning framework to achieve the optimal running efficiency on hardware, the framework also needs to have custom graph optimization strategies which may be adapted by hardware devices according to their own characteristics, so that the framework can take full advantage of the performance of the hardware.

In detail, the deep learning framework can be, for example, a PaddlePaddle, a Tensorflow, a Convolutional Architecture for Fast Feature Embedding (Caffe), a Theano, a MXNet, a Torch, and a PyTorch.

In another possible implementation, the model framework may also be a machine learning framework.

The operator representation of the target model may be an operator representation of the model framework of the target model.

Information of the access device can be information on a type of the access device, or optimization operations allowed to be performed. The optimization operations may include combining repetitive operations, deleting unnecessary operations, adding default operations, modifying content or parameters that need to be modified. Optimizing the computational graph based on the information of the access device may include determining the optimization operations to be performed on the computational graph based on the information of the access device, for example, the optimization operation of combining N adding operations in the computational graph.

In the embodiment, performing the relevant running operations of the target model on the access device based on the interface for the access device to access the model framework of the target model and the computational graph includes: obtaining execution data of the access device according to the interface of the model framework of the target model, and realizing the running of the target model on the access device by performing operations on the access device according to the execution data of the access device and the computational graph converted by the target model.

In the embodiment, there can be multiple kinds of access devices. Different access devices may access the model framework of the target model through different interfaces. The interface of the model framework can be determined by the type of the access device, and the type of the access device can be determined according to kit data of the access device.

In the case where the access device is any available hardware, the kit data of the access device can be SDK.

The current mainstream approach for the deep learning framework to access heterogeneous hardware follows the earlier hardware adaptation scheme oriented to universal CPUs and NVIDIA Graphics Processing Units (GPUs), which is a tightly coupled access approach. At the same time, the deep learning framework focuses more on technical optimization and innovation of the framework itself, and the framework only maintains access device products such as separate models of intelligent chips. The support for other heterogeneous access devices and the work of adaptation development are usually carried out by the access device manufacturers themselves.

In the embodiment, it is possible to optimize the computational graph associated with the operation of the target model based on the operator representation of the target model and a situation of the access device of the target model, and the computational graph optimization and interface accessing are performed separately. Therefore, improvements on the interface can be made when accessing the interface, so that the improved interface is adaptable to more different access devices, and the difficulty of adapting to different access devices and the amount of modified data are reduced.

In an implementation, the access method further includes: determining a type of the access device based on the kit data; and determining an interface in the model framework for the access device based on the type of access device.

In the embodiment, determining the type of the access device based on the kit data may include determining the manufacturer, model, operating conditions, or optimization conditions of the access device, or individualization information different from other access devices.

The universal interface in the model framework for the access device determined based on the type of the access device may be a major type of universal interfaces corresponding to the access device. For example, if the access device is a chip, according to a classification method, the chips can be classified into a first type, a second type and a third type. The first type of chips can be classified into different brands or models. A first universal interface can be set for the first type of chips, a second universal interface can be set for the second type of chips, and a third universal interface can be set for the third type of chips, and so on.

In the embodiment, a universal interface can be set according to the type of the chip, so that it possible to perform the construction of interfaces per type and minimize the amount of work involved in setting up interfaces.

In an implementation, the universal interface is generated by abstracting and encapsulating a corresponding driving and runtime interface in the model framework for the access devices based on the commonality of the access devices.

In the embodiment, generating the universal interface by abstracting and encapsulating the interface based on the commonality may refer to generating the universal interface by abstracting and encapsulating the interface based on the commonality of all access devices or a certain type of access devices.

The commonality of the access devices may be a common feature of the information required or involved in a connection between the access device and the interface.

In this embodiment, the driving and runtime interface may include a separate driving interface and a separate runtime interface, and the driving and runtime interface may also include a combination of a driving interface and a runtime interface.

In addition, abstracting and encapsulating the interface based on the commonality of the access devices can improve the versatility of the interface.

Figure 2:
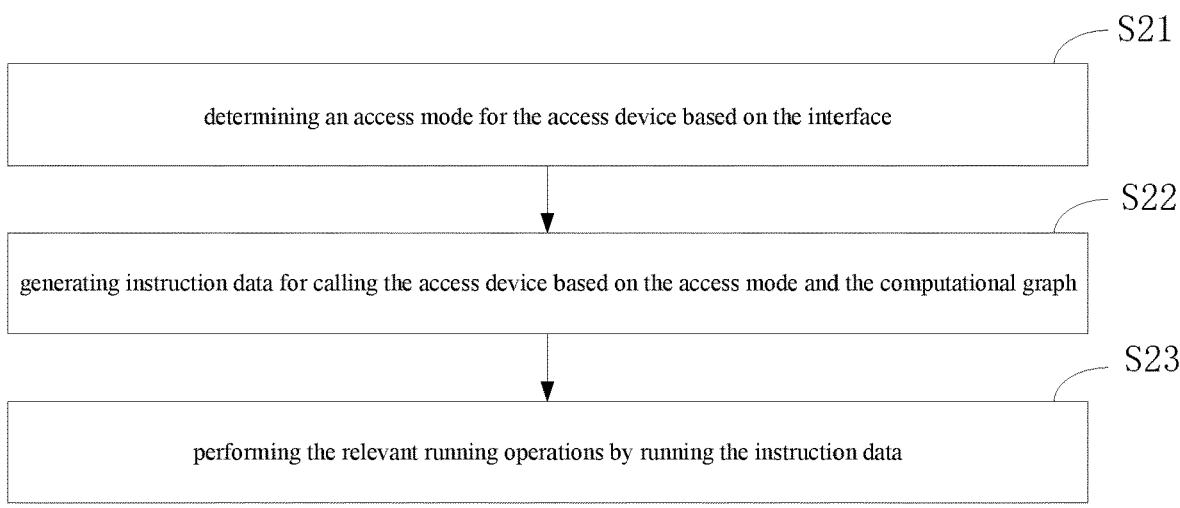
FIG. 2 is a flowchart of an access method according to another embodiment of the disclosure.

In an embodiment, as illustrated in FIG. 2, performing the relevant running operations of the target model on the access device based on the interface for the access device to access to the model framework of the target model and the computational graph includes the following blocks.

At block S21, an access mode for the access device is determined based on the interface.

At block S22, instruction data for calling the access device is generated based on the access mode and the computational graph.

At block S23, the relevant running operations are performed by running the instruction data.

Since the interface corresponding to the access device can be determined based on the type of the access device, determining the access mode according to the interface may include determining the access mode corresponding to the access device according to the type of the access device, or determining the access mode corresponding to the access device according to the information in the SDK of the access device.

In the embodiment, different access modes can be used for different access devices, thereby further improving the versatility of the target model for different types, models and brands of access devices or access devices of different manufacturers.

In an implementation, in the case where the access mode is operator access, and the computational graph includes a first computational graph of the model framework of the target model, and generating the instruction data for calling the access device based on the access mode and the computational graph includes: mapping the first computational graph to a framework operator; and generating the instruction data based on the framework operator and a device operator of the access device.

In addition to the first computational graph of the model framework, the computational graph may also include the computational graph of a model portion.

Mapping the first computational graph to the framework operator may include mapping the optimized first computational graph to the framework operator.

When mapping the computational graph, the mapping can be performed with reference to a preset mapping table.

Generating the instruction data of the access device according to the framework operator and the device operator of the access device may include fusing the framework operator and the device operator, and converting the fused operator into a code for calling or driving the access device.

In this embodiment, the computational graph is mapped into an operator, and instruction data is generated according to the operator, so that operation of the access device may be performed and then the target model can run on the access device. Meanwhile, the embodiment provides an operator-based access method, so that devices that support operator access can access the model framework.

In an implementation, in the case where the access mode is computational graph access, the computational graph includes a first computational graph of the model framework of the target model and a second computational graph of the access device, and generating the instruction data for calling the access device based on the access mode and the computational graph, includes: generating a graph Interim Representation (IR) based on the first computational graph and predefined operator IR; and generating the instruction data based on the graph IR and the second computational graph.

In the embodiment, the graph IR may be a number of images or directed graph data.

The embodiment can provide an access mode based on the computational graph access, so that access devices that can only access via the computational graph also run the target model.

In the embodiment, optimizing the computational graph may include optimizing at least any one of the first computational graph and the second computational graph.

Moreover, generating the graph IR based on the first computational graph and the predefined operator IR may include generating graph IR units from at least one computational graph unit of the first computational graph according to the predefined operator IR, and generating the graph IR of the first computational graph according to at least one of the generated graph IR units.

In a possible implementation, the target model may choose to access via the computational graph or the operator based on the SDK of the access device.

In an implementation, optimizing the computational graph based on the information of the access device, includes: determining optimization operations to be performed on the computational graph and computational graph units to be optimized based on the information of the access device; and performing the optimization operations on the computational graph units.

In the embodiment, the computational graph may include a plurality of computational graph units. Each computational graph unit may correspond to a computational operation, e.g., a convolution operation, an addition operation and an activation operation. The plurality of computational graph units may include repetitive computational graph units or computational graph units with different contents.

The computational graph units to be optimized may be computational graph units with repetitive contents, computational graph units that can be combined for easy of execution or computational graph units that can be counteracted. For example, if one of the computational graph units to be optimized is an addition operation and the other is a subtraction operation, and parameters of the addition operation are identical to parameters of the subtraction operation, then the two operations can be counteracted and the computational graph unit for the addition operation and the computational graph unit for the subtraction operation may be deleted.

In the embodiment, the optimization operations are performed on the computational graph units, so that redundant steps can be avoided and operational efficiency can be improved when running the target model.

Figure 3:
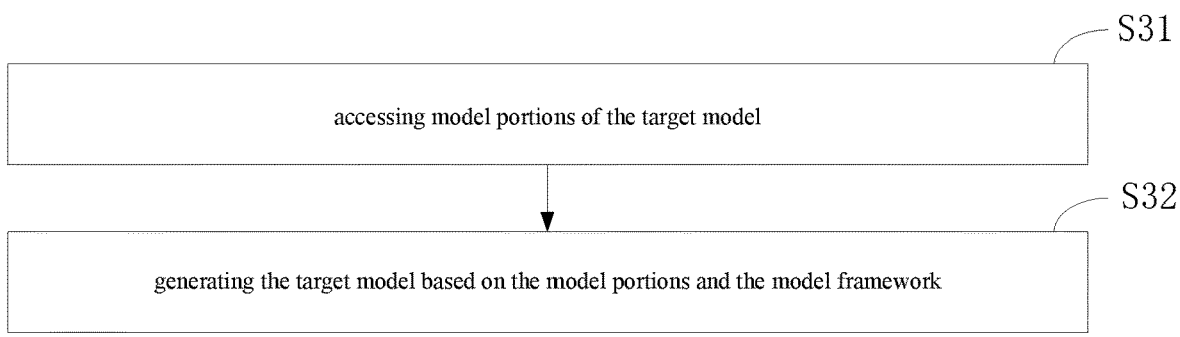
FIG. 3 is a flowchart of an access method according to yet another embodiment of the disclosure.

In an implementation, as illustrated in FIG. 3, the access method further includes the following blocks.

At block S31, a model portion of the target model are accessed.

At block S32, the target model is generated based on the model portion and the model framework.

In the embodiment, the model portion of the target model can be a portion composed of non-universal codes, may be a trained and optimized model or a model to be optimized.

Moreover, generating the target model based on the model portion and the model framework may include inputting the model portion into the model framework, so that the model portion and the model framework are combined to obtain the target model.

In the embodiment, the access device can access the target model through the model framework of the target model.

The target model of the embodiment includes the model portion and the model framework, so that the portion that is connected to the access device may improve the generality of the target model by optimizing the model framework portion.

Firstly, the deep learning model is converted into a computational graph (e.g., a directed graph) representation of the deep learning framework through API of the deep learning framework. The deep learning framework analyses and optimizes the computational graph before executing and scheduling the computational graph, here the optimization refers only to a universal hardware-independent optimization strategy. Different access modes are provided for different types of hardware SDKs, or for the same hardware SDK, which specifically include an operator access mode and a computational graph access mode.

Figure 4A:
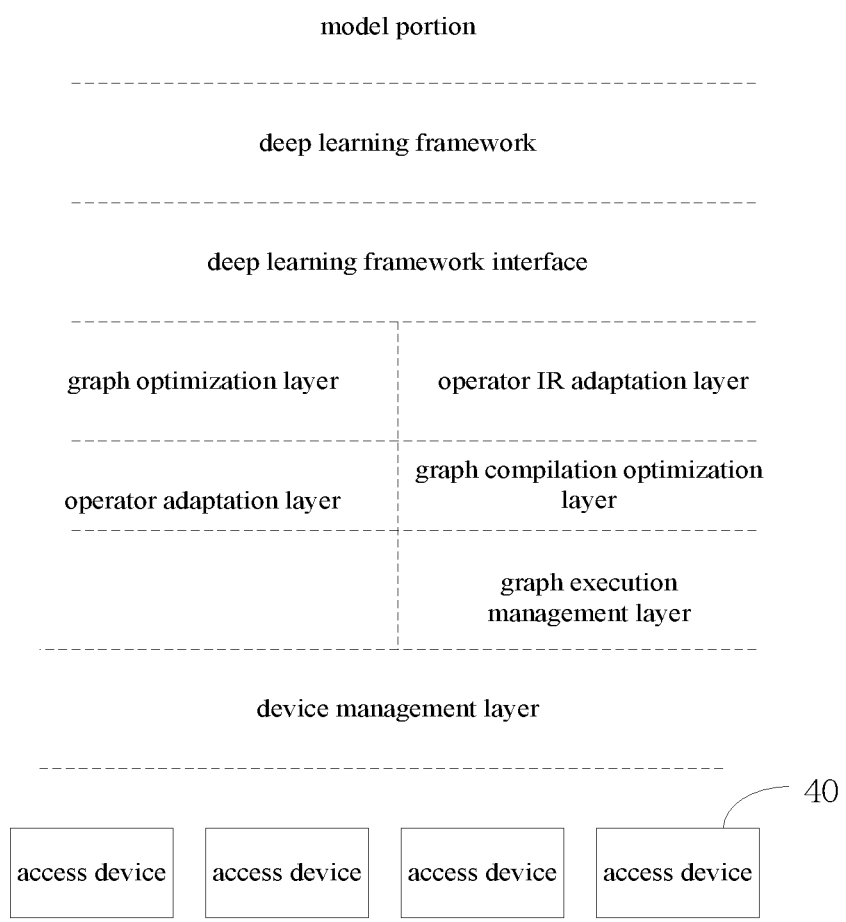
FIG. 4A is a schematic diagram of a framework of an access method according to an example embodiment of the disclosure.

As illustrated in FIG. 4A, in the preparation phase, the model portion is input into the deep learning framework and fused with the deep learning framework, and the target model is output from the interface of the deep learning framework, so that universal optimization independent of the hardware of the access device can be performed for the target model. After performing the universal optimization, different layering processes are applied for operator access or computational graph access of the access device. As illustrated in FIG. 4A, for the operator access mode, the example sets up three access modules for different levels.

A device management layer is configured for access of a driving and runtime module of the hardware SDK so that the hardware can be recognized by the framework as computing resources, and configured to manage information such as Device, Memory, Stream and Events.

An operator adaptation layer is configured for access of deep learning related modules of the intelligent chip, the modules may include a DNN operator library, a BLAS mathematical library and a communication library, so that the framework operators can be mapped as executable codes packaged via the hardware SDK on the target hardware.

A graph optimization layer is configured to provide custom optimization strategies for heterogeneous hardware to customize the strategy according to their own hardware characteristics. The graph optimization layer may include a framework operator execution scheduler, to perform optimization according to a custom graph optimization strategy of the framework or an access device customized strategy for its own hardware.

In the embodiment, the device management layer and the operator adaptation layer mainly focus on the generality of hardware adaptation, to provide a universal interface design to a wide range of hardware, thereby avoiding the difficulty of adapting to other heterogeneous hardware due to deep coupling with one hardware. The graph optimization layer focuses on differentiation, supports hardware to access an optimization strategy that improves the performance of its own hardware in the deep learning framework, so that the execution efficiency of hardware can be fully utilized in the deep learning framework.

For the computational graph access mode, as illustrated in FIG. 4A, access of the access devices is carried out through four access modules of different levels, i.e., a device management layer, an operator IR adaptation layer in turn.

The device management layer is configured for access of a driving and runtime module of the hardware SDK, and the hardware is identified of the framework (i.e., the model framework in the preceding embodiments) as computing resources. The device management layer may be shared in the computational graph access mode and the operator access mode, the layer may be accessed by at least one heterogeneous access device 40 or at least one heterogeneous module of the access device 40.

The operator IR adaptation layer is configured for mapping the framework operator to the IR operator according to the operator library of the device or compiler, to enable the operator of the deep learning framework to be mapped to the IR operator of a device graph compilation engine (model builder) of an intelligent chip or to the IR operator of the neural network compiler.

The graph compilation optimization layer is configured to convert the computational graph of the model framework into an IR, that is, the computational graph of the deep learning framework is converted into a graph IR of the device model builder or the neural network compiler by the model builder of the access device or the neural network compiler according to the mapping of the "operator IR adaptation layer". The device model builder or the neural network compiler has its own optimization strategy to optimize the IR of the computational graph and ultimately convert it into executable codes that can run on a hardware device.

The graph execution management layer is configured for access of model scheduling and execution functionality of the hardware SDK, to enable a graph execution engine of the model framework or the neural network executor to manage the lifecycle of the computational graph and obtain the final output results.

In the example, all four levels are designed for the generality of hardware access. Hardware-related optimization strategies are mainly implemented by the device model builder or the neural network compiler itself, and the deep learning framework only provides hardware-independent universal optimization strategies.

The design of general deep learning frameworks for hardware adaptation is mainly based on the SDK implementation of general CPUs and NVIDIA GPUs, without producing a more general hardware access method and system for access devices to guide hardware manufacturers of intelligent chips to carry out adaptation development. Manufacturers of heterogeneous hardware need to forcibly imitate CUDA's Application Programming Interface (API) for hardware access, which is very unfriendly to the SDKs of other heterogeneous hardware different from CUDA, and the complexity of the adaptation of hardware and framework is high and the amount of codes is large. In the design of performance optimization strategies for the deep learning framework, apart from general hardware-independent optimization strategies, optimization strategies that are more relevant to hardware characteristics are designed primarily for general CPUs and NVIDIA GPUs, which cannot fully exploit the execution efficiency of heterogeneous hardware in the deep learning framework.

The example proposes two types of multi-level designs for different hardware access modes, the concept of accessing through multi-level heterogeneous hardware access devices provides multi-level designs for the two access modes, to guide multiple heterogeneous hardware to access the deep learning framework through different levels of interface implementation. The hardware access mode is more universal compared to the traditional access mode designed for a single access device, thereby avoiding deep coupling with a certain hardware, which makes it difficult to access other hardware with large differences. The hardware optimization strategy is more customizable compared to traditional strategies designed for a single access device, which supports multiple heterogeneous hardware to customize optimization strategies based on their own characteristics, thereby ensuring the execution efficiency of hardware in the framework.

The embodiment of the disclosure provides an access method that optimizes accessing of access devices to a model framework or a target model, and the access device may be a hardware device.

Figure 4B:
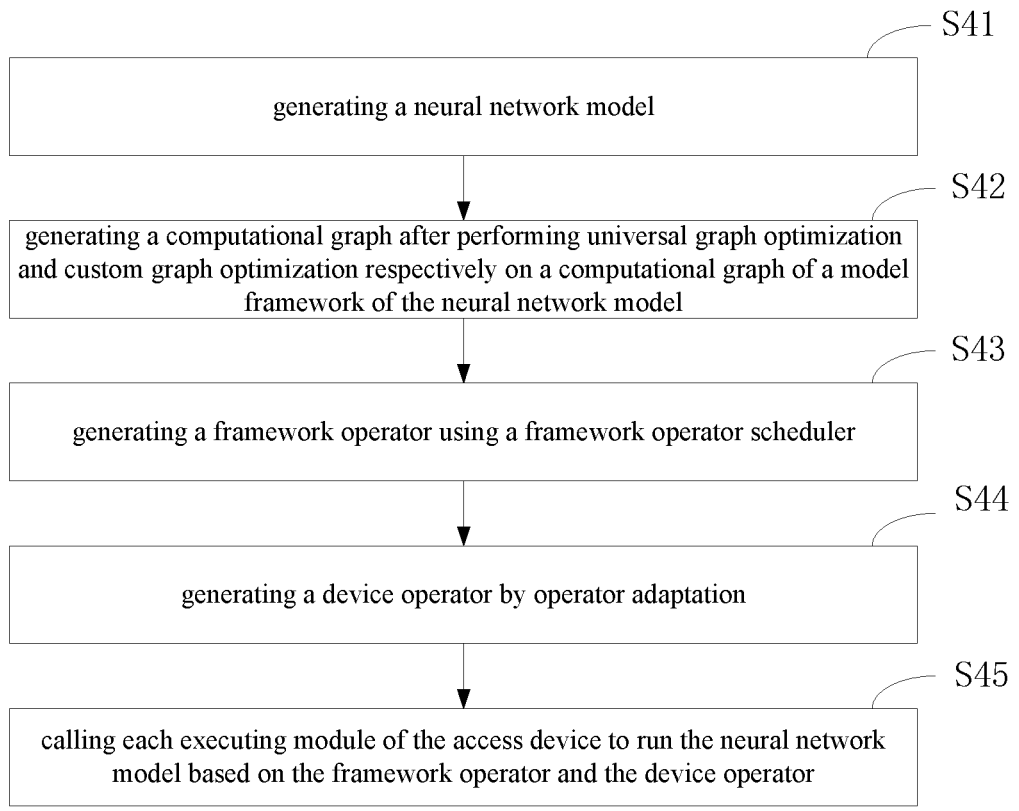
FIG. 4B is a flowchart of an access method based on operator access according to an example embodiment of the disclosure.

In another embodiment of the disclosure, as illustrated in FIG. 4B, when the access mode is operator access, the access method may include the following blocks.

At block S41, a neural network model is generated. In detail, a model framework (equivalent to the model framework in the previous embodiments) and a model portion of a deep neural network may be fused. The neural network model may be any model that includes a neural network. The neural network model outputs via a Python API interface, and the neural network model is equivalent to the target model in the above embodiments.

At block S42, universal graph optimization and custom graph optimization are performed respectively based on a computational graph of the model framework of the neural network model, to generate an optimized computational graph of the framework.

At block S43, a framework operator is generated using a frame operator scheduler.

At block S44, a device operator is generated by operator adaptation.

At block S45, based on the framework operator and the device operator, each execution module of the access device is called to run the neural network model.

Figure 4C:
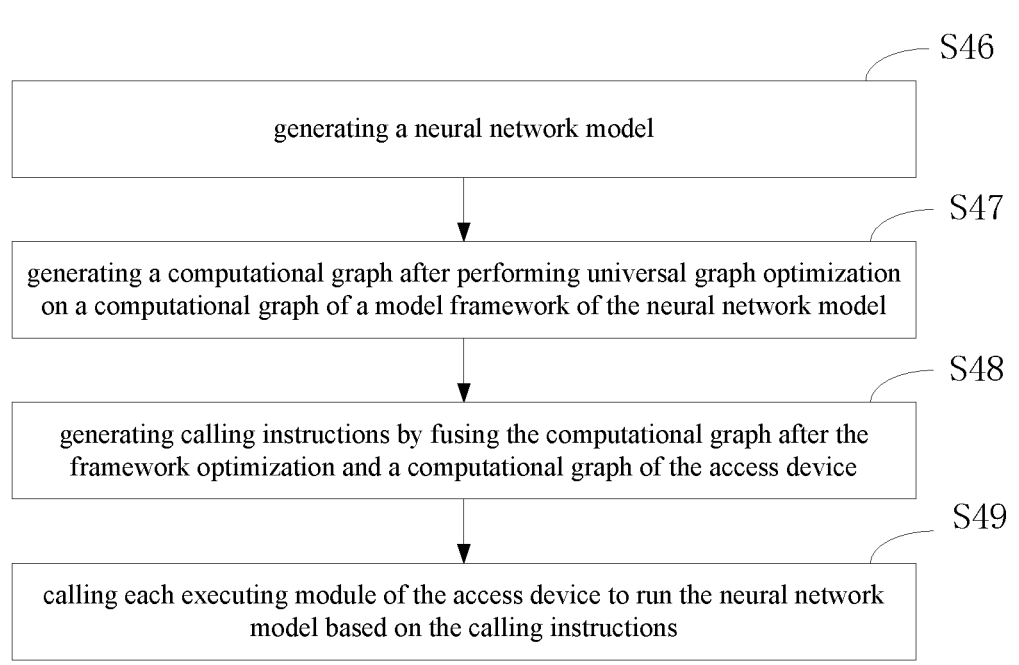
FIG. 4C is a flowchart of an access method based on computational graph access according to an example embodiment of the disclosure.

As illustrated in FIG. 4C, when the access mode is computational graph access, the access method may include the following blocks.

At block S46, a neural network model is generated. In detail, a model framework (equivalent to the model framework in the previous embodiments) and a model portion of a deep neural network may be fused. The neural network model may be any model that includes a neural network. The neural network model outputs via a Python API interface, and the neural network model is equivalent to the target model in the above embodiments.

At block S47, based on a computational graph of the model framework of the neural network model, universal graph optimization is performed to generate an optimized computational graph of the framework.

At block S48, the optimized computational graph of the framework and a computational graph of the access device are fused to generate calling instructions.

At block S49, according to the calling instructions, each execution module of the access device is called to run the neural network model.

Figure 5:
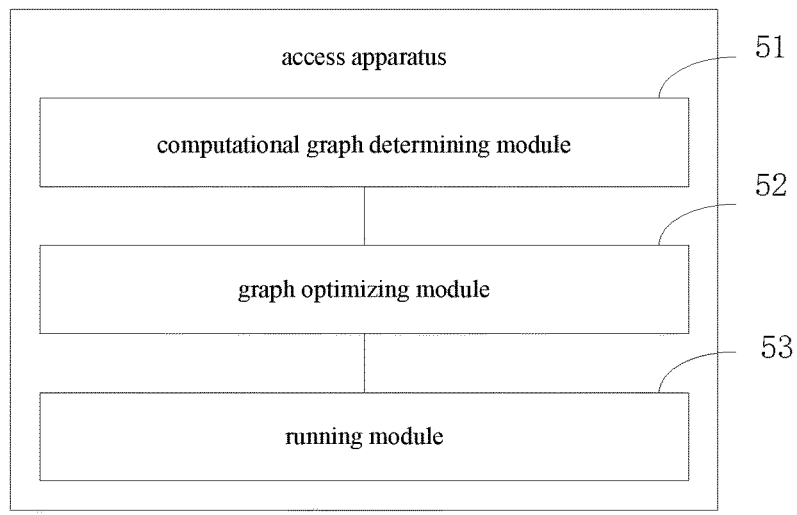
FIG. 5 is a block diagram of an access apparatus according to an embodiment of the disclosure.

The embodiment of the disclosure also provides an access apparatus. As illustrated in FIG. 5, the apparatus further includes: a computational graph determining module 51, a graph optimizing module 52 and a running module 53.

The computational graph determining module 51 is configured to determine a computational graph for calling an access device based on operator representations in a target model.

The graph optimizing module 52 is configured to optimize the computational graph based on information of the access device.

The running module 53 is configured to perform relevant running operations of the target model on the access device based on an interface for the access device to access to a model framework of the target model and the computational graph, the interface being determined based on kit data of the access device.

Figure 6:
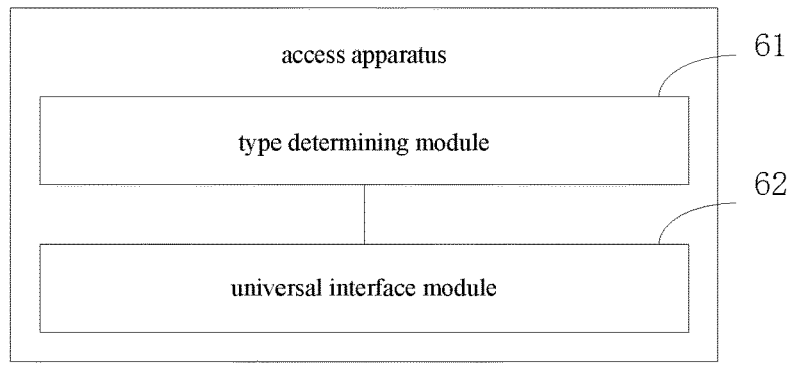
FIG. 6 is a block diagram of an access apparatus according to another embodiment of the disclosure.

In an implementation, as illustrated in FIG. 6, the access apparatus further includes: a type determining module 61 and a universal interface module 62.

The type determining module 61 is configured to determine a type of the access device based on the kit data.

The universal interface module 62 is configured to determine an interface in the model framework for the access device based on the type of access device.

In an implementation, the interface is generated by abstracting and encapsulating a driving and runtime interface in the model framework for the access devices based on commonality of the access devices.

Figure 7:
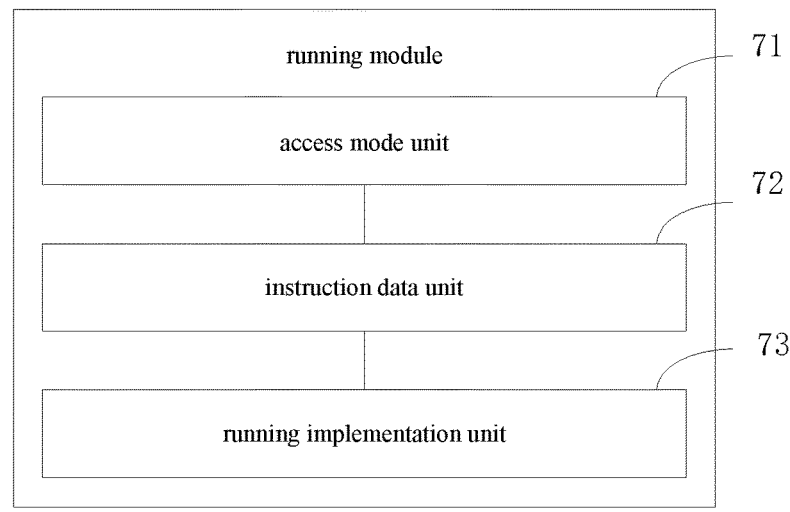
FIG. 7 is a block diagram of an access apparatus according to yet another embodiment of the disclosure.

In an implementation, as illustrated in FIG. 7, the running module includes: an access mode unit 71, an instruction data unit 72 and a running implementation unit 73.

The access mode unit 71 is configured to determine an access mode for the access device based on the interface.

The instruction data unit 72 is configured to generate instruction data for calling the access device based on the access mode and the computational graph.

The running implementation unit 73 is configured to perform the relevant running operations by running the instruction data.

In an implementation, in the case where the access mode is operator access, and the computational graph includes a first computational graph of the model framework of the target model, and the instruction data unit is further configured to: map the first computational graph to a framework operator; generate the instruction data based on the framework operator and a device operator of the access device.

In an implementation, in the case where the access mode is computational graph access, the computational graph includes a first computational graph of the model framework of the target model and a second computational graph of the access device, and the instruction data unit is further configured to: generate a graph interim representation based on the first computational graph and predefined operator IR; and generate the instruction data based on the graph IR and the second computational graph.

Figure 8:
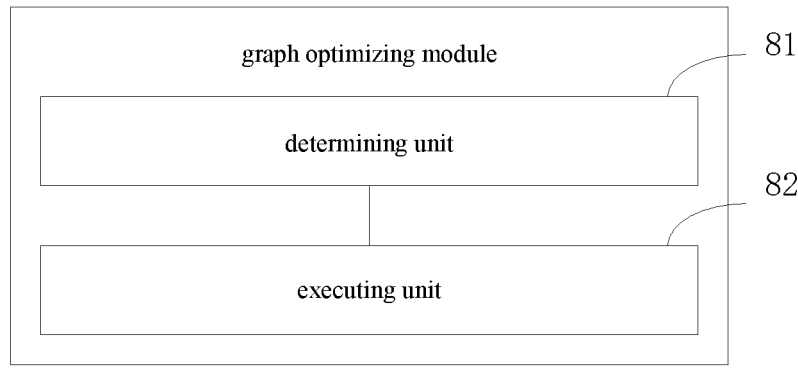
FIG. 8 is a block diagram of an access apparatus according to a further embodiment of the disclosure.

In an implementation, as illustrated in FIG. 8, the graph optimizing module includes: a determining unit 81 and an executing unit 82.

The determining unit 81 is configured to determine optimization operations to be performed on the computational graph and computational graph units to be performed based on the information of the access device.

The executing unit 82 is configured to perform the optimization operations on the optimized computational graph units.

Figure 9:
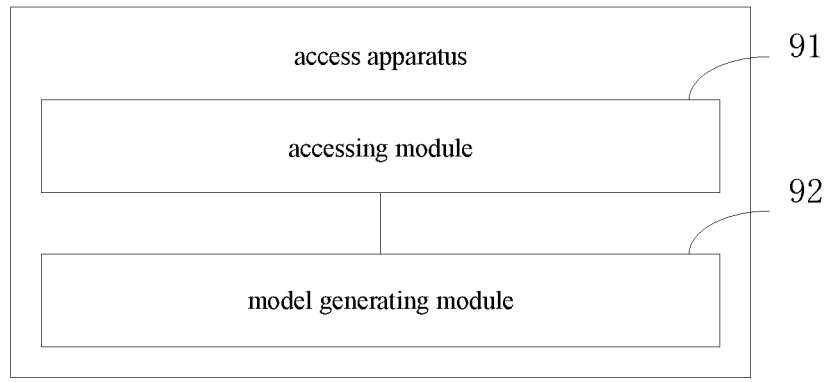
FIG. 9 is a block diagram of an access apparatus according to another further embodiment of the disclosure.

In an implementation, as illustrated in FIG. 9, the access device further includes: an accessing module 91 and a model generating module 92.

The accessing module 91 is configured to access a model portion of the target model.

The model generating module 92 is configured to generate the target model based on the model portion and the model framework.

In the technical solution of the disclosure, collection, storage and application of the user's personal information involved are all in compliance with relevant laws and regulations, and do not violate public order and good customs.

According to the embodiments of the disclosure, the disclosure provides an electronic device, and a readable storage medium and a computer program product.

Figure 10:
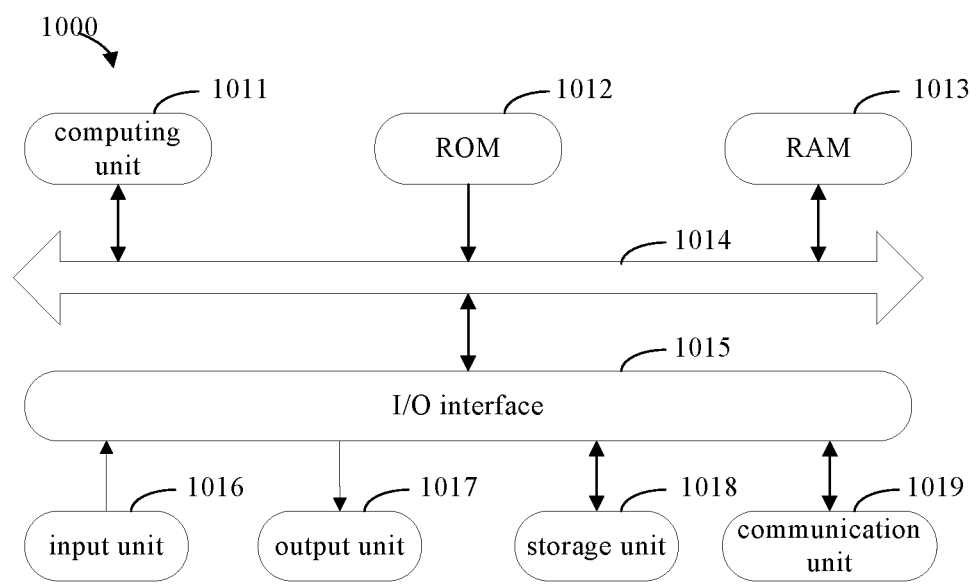
FIG. 10 is a block diagram of an electronic device used to implement the access method of the embodiment of the disclosure.

FIG. 10 is a block diagram of an example electronic device 1000 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 10, the electronic device 1000 includes: a computing unit 1011 performing various appropriate actions and processes based on computer programs stored in a read-only memory (ROM) 1012 or computer programs loaded from the storage unit 1018 to a random access memory (RAM) 1013. In the RAM 1013, various programs and data required for the operation of the device 1000 are stored. The computing unit 1011, the ROM 1012, and the RAM 1013 are connected to each other through a bus 1014. An input/output (I/O) interface 1015 is also connected to the bus 1014.

Components in the device 1000 are connected to the I/O interface 1015, including: an inputting unit 1016, such as a keyboard, a mouse; an outputting unit 1017, such as various types of displays, speakers; a storage unit 1018, such as a disk, an optical disk; and a communication unit 1019, such as network cards, modems, and wireless communication transceivers. The communication unit 1019 allows the device 1000 to exchange information/data with other devices through a computer network such as the Internet and/or various telecommunication networks.

The computing unit 1011 may be various general-purpose and/or dedicated processing components with processing and computing capabilities. Some examples of the computing unit 1011 include, but are not limited to, a CPU, a GPU, various dedicated AI computing chips, various computing units that run machine learning model algorithms, and a Digital Signal Processor (DSP), and any appropriate processor, controller and microcontroller. The computing unit 1011 executes the various methods and processes described above, such as the access method. For example, in some embodiments, the above method may be implemented as a computer software program, which is tangibly contained in a machine-readable medium, such as the storage unit 1018. In some embodiments, part or all of the computer program may be loaded and/or installed on the device 1000 via the ROM 1012 and/or the communication unit 1019. When the computer program is loaded on the RAM 1013 and executed by the computing unit 1011, one or more steps of the method described above may be executed. Alternatively, in other embodiments, the computing unit 1011 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. An access method, comprising:
   determining a computational graph for calling an access device based on an operator representation of a target model;
   optimizing the computational graph based on information of the access device; and
   running the target model by the access device based on the computational graph and an interface of the model framework of the target model for accessing of the access device, the interface being determined based on kit data of the access device;
   wherein running the target model by the access device based on the computational graph and the interface of the model framework of the target model for accessing of the access device, comprises:
   determining an access mode for the access device based on the interface, wherein the access mode comprises computational graph access and operator access;
   generating instruction data for calling the access device based on the access mode and the computational graph; and
   performing the relevant running operations by running the instruction data.

2. The method of claim 1, further comprising:
   determining a type of the access device based on the kit data; and
   determining the interface for the access device to access the model framework based on the type of access device.

3. The method of claim 2, wherein the interface is generated by abstracting and encapsulating a driving and runtime interface in the model framework for access devices based on commonality of the access devices.

4. The method of claim 1, wherein in a case where the access mode is operator access, and the computational graph comprises a first computational graph of the model framework of the target model, and generating the instruction data for calling the access device based on the access mode and the computational graph, comprises:
   mapping the first computational graph to a framework operator; and
   generating the instruction data based on the framework operator and a device operator of the access device.

5. The method of claim 1, wherein in a case where the access mode is computational graph access, the computational graph comprises a first computational graph of the model framework of the target model and a second computational graph of the access device, and generating the instruction data for calling the access device based on the access mode and the computational graph, comprises:
   generating a graph interim representation (IR) based on the first computational graph and predefined operator IR; and
   generating the instruction data based on the graph IR and the second computational graph.

6. The method of claim 1, wherein optimizing the computational graph based on the information of the access device, comprises:
   determining optimization operations to be performed on the computational graph and computational graph units to be optimized based on the information of the access device; and
   performing the optimization operations on the computational graph units.

7. The method of claim 1, further comprising:
   accessing a model portion of the target model; and
   generating the target model based on the model portion and the model framework.

8. An electronic device, comprising:
   at least one processor; and a memory communicatively coupled to the at least one processor; wherein, the memory stores instructions executable by the at least one processor, when the instructions are executed by the at least one processor, the at least one processor is caused to implement the followings:

determining a computational graph for calling an access device based on an operator representation of a target model;

optimizing the computational graph based on information of the access device; and running the target model by the access device based on the computational graph and an interface of the model framework of the target model for accessing of the access device, the interface being determined based on kit data of the access device;

wherein running the target model by the access device based on the computational graph and the interface of the model framework of the target model for accessing of the access device, comprises:

determining an access mode for the access device based on the interface, wherein the access mode comprises computational graph access and operator access;

generating instruction data for calling the access device based on the access mode and the computational graph; and performing the relevant running operations by running the instruction data.

9. The device of claim 8, wherein the at least one processor is caused to implement the followings:

determining a type of the access device based on the kit data; and determining the interface for the access device to access the model framework based on the type of access device.

10. The device of claim 9, wherein the interface is generated by abstracting and encapsulating a driving and runtime interface in the model framework for access devices based on commonality of the access devices.

11. The device of claim 8, wherein in a case where the access mode is operator access, and the computational graph comprises a first computational graph of the model framework of the target model, and generating the instruction data for calling the access device based on the access mode and the computational graph, comprises:

mapping the first computational graph to a framework operator; and generating the instruction data based on the framework operator and a device operator of the access device.

12. The device of claim 8, wherein in a case where the access mode is computational graph access, the computational graph comprises a first computational graph of the model framework of the target model and a second computational graph of the access device, and generating the instruction data for calling the access device based on the access mode and the computational graph, comprises:

generating a graph interim representation (IR) based on the first computational graph and predefined operator IR; and generating the instruction data based on the graph IR and the second computational graph.

13. The device of claim 8, wherein optimizing the computational graph based on the information of the access device, comprises:

determining optimization operations to be performed on the computational graph and computational graph units to be optimized based on the information of the access device; and performing the optimization operations on the computational graph units.

14. The device of claim 8, wherein the at least one processor is caused to implement the followings:

accessing a model portion of the target model; and generating the target model based on the model portion and the model framework.

15. A non-transitory computer-readable storage medium having computer instructions stored thereon, wherein the computer instructions are configured to cause a computer to implement the followings:

determining a computational graph for calling an access device based on an operator representation of a target model;

optimizing the computational graph based on information of the access device; and running the target model by the access device based on the computational graph and an interface of the model framework of the target model for accessing of the access device, the interface being determined based on kit data of the access device;

wherein running the target model by the access device based on the computational graph and the interface of the model framework of the target model for accessing of the access device, comprises:

determining an access mode for the access device based on the interface, wherein the access mode comprises computational graph access and operator access;

generating instruction data for calling the access device based on the access mode and the computational graph; and performing the relevant running operations by running the instruction data.

16. The storage medium of claim 15, wherein the at least one processor is caused to implement the followings:

determining a type of the access device based on the kit data; and determining the interface for the access device to access the model framework based on the type of access device.

17. The storage medium of claim 16, wherein the interface is generated by abstracting and encapsulating a driving and runtime interface in the model framework for access devices based on commonality of the access devices.

* * * * *